UNITED STATES PATENT OFFICE.

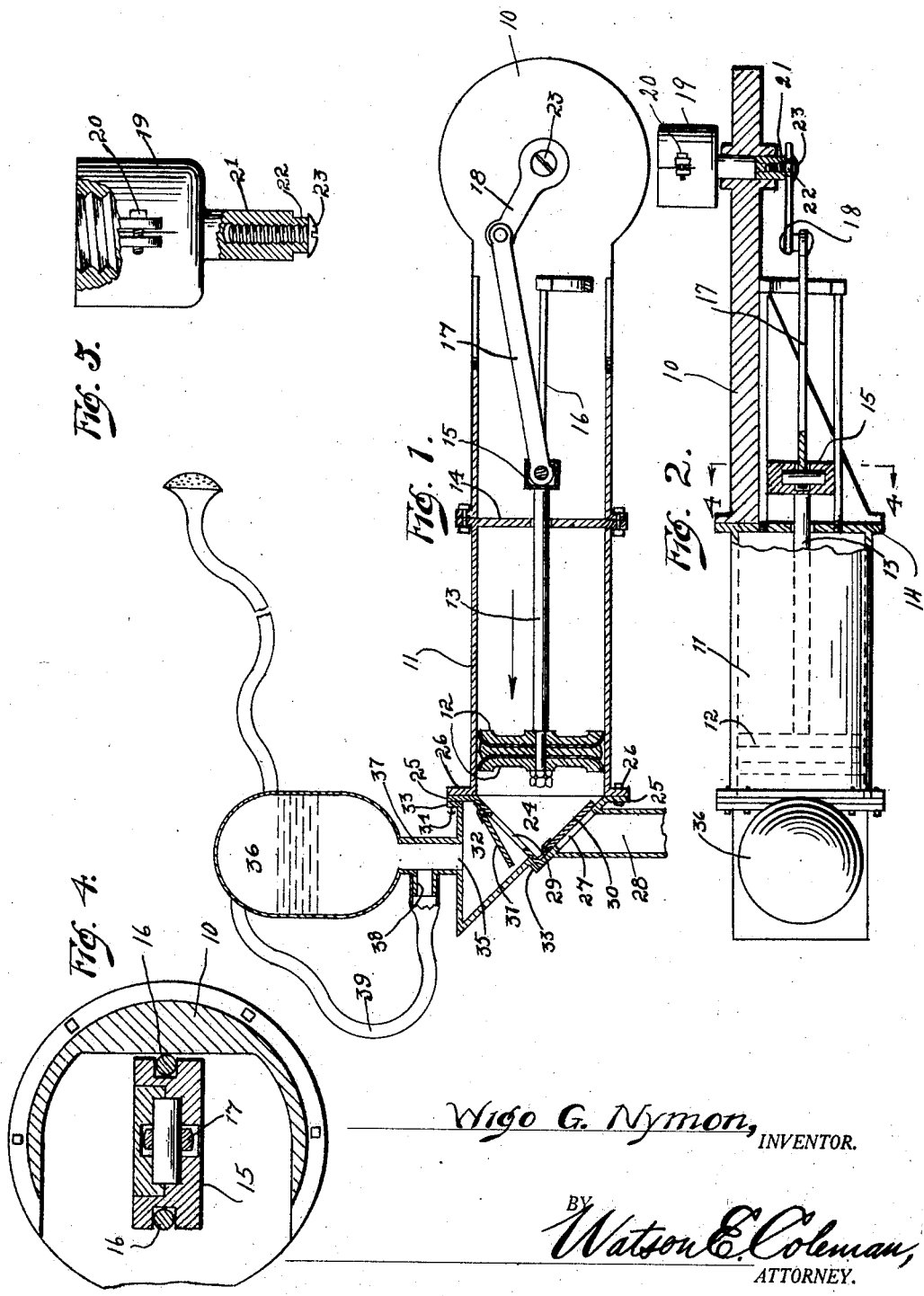

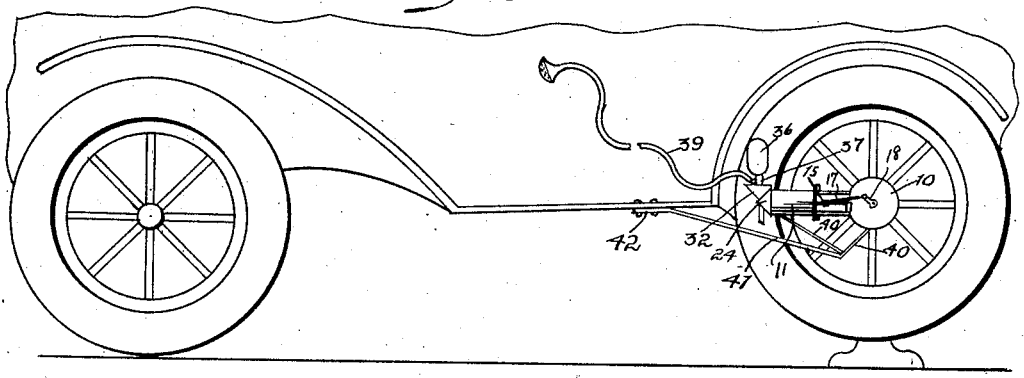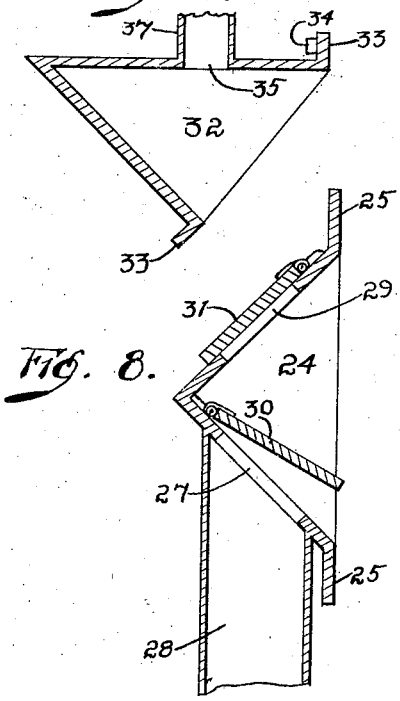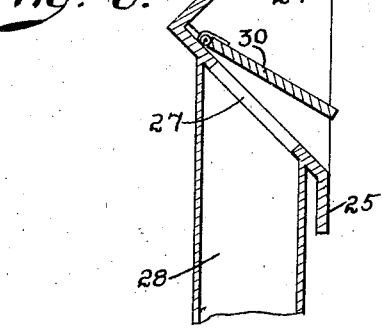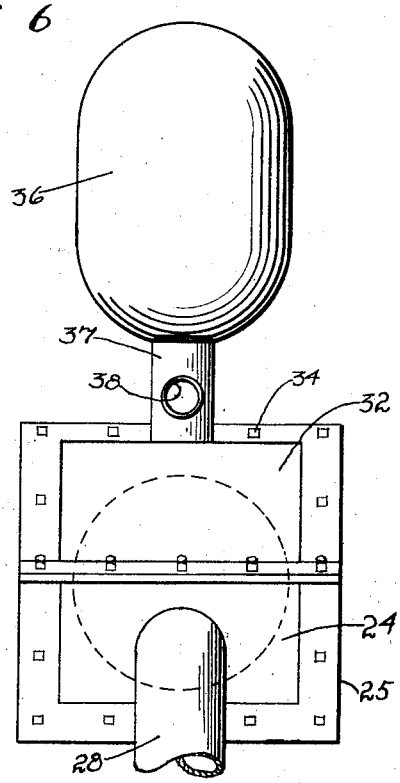

WIGO G. NYMON, OF FARGO, NORTH DAKOTA.

AUTOMOBILE-ACTUATED PUMP.

1,391,968. Specification of Letters Patent. Patented Sept. 27, 1921.

Application filed March 5, 1921. Serial No. 449,819.

*To all whom it may concern:*

Be it known that I, WIGO G. NYMON, a citizen of the United States, residing at Fargo, in the county of Cass and State of North Dakota, have invented certain new and useful Improvements in Automobile-Actuated Pumps, of which the following is a specification, reference being had to the accompanying drawings.

This invention relates to pumping mechanism, and particularly to pumps adapted to be actuated by a driving shaft of an automobile.

The general object of my invention is to provide a pump of this character which may be quickly attached in place of the hub cap which holds one of the driving wheels of the automobile in place and which may be, therefore, driven by the usual driving mechanism of the automobile, and which is particularly adapted for use in washing automobiles.

A further object is to provide a pump of this character which is very simply constructed, which is adapted, when applied, to be supported rigidly in place, and which is adapted to be used for a large variety of purposes wherever a pump is needed.

My invention is illustrated in the accompanying drawings, wherein:—

Figure 1 is a longitudinal sectional view of an automobile pump constructed in accordance with my invention;

Fig. 2 is a plan view partly in section of the construction shown in Fig. 1;

Fig. 3 is a side elevation of an automobile having my device applied thereto;

Fig. 4 is a section on the line 4—4 of Fig. 2;

Fig. 5 is a detailed elevation of the coupling partly in section;

Fig. 6 is a front elevation of the pump;

Fig. 7 is a vertical sectional view of the cap 32;

Fig. 8 is a vertical sectional view of the head 24.

Referring to these drawings, 10 designates the frame of the pump and 11 the cylinder thereof. Operating within the cylinder is a piston 12 having a piston rod 13 which is shown as passing through a cylinder head 14 and as being connected to a cross head 15 operating in cross head guides 16 operatively supported on the cylinder head and frame. To the cross head is operatively connected the pitman 17, which in turn is connected to a crank 18. This crank 18 is adapted to be connected to the rear drive shaft of the automobile by means of a coupling. This coupling consists of a hollow, internally screw-threaded head 19 which is split and adapted to engage over the extremity of the drive shaft and in place of the usual hub cap and then to be clamped thereon by means of the bolt 20 which passes through lugs formed on the split head 19. The coupling is provided with a shank 21 having a squared extremity 22 which is adapted to be inserted in a socket formed in the crank 18 and held in place by a screw 23. By this means the rotation given to a rear drive shaft of an automobile will be communicated to the crank 18 and thus to the piston 12. This piston may be of any suitable character and is designed to be packed by the usual leather rings or other suitable packing.

The outer end of the cylinder 11 is closed by a head designated generally 24. This head is approximately triangular in vertical section, as illustrated, and is formed with a marginal flange 25 whereby it may be attached by bolts to a flange 26 projecting from the end of the cylinder 11. This head is formed with an intake opening 27 having an intake pipe 28 leading therefrom and opposite the intake opening with an outlet opening 29.

Controlling the inlet through the inlet opening 27 is an inwardly opening check valve 30 which is shown as pivoted to the wall of the inlet opening 27 inward of this wall, and controlling the outlet of liquid is an outwardly opened check valve 31 hinged or otherwise attached to the wall defining the outlet opening. Extending over that face of the head 24 within which is disposed the outlet opening 29 is a cap 32 which is illustrated as triangular in section and open on one face and provided with flanges 33 through which bolts 34 pass whereby the cap may be attached to the head 24. This cap houses the outlet valve 31 and is of sufficient size to permit the opening of the outlet valve, and this cap in turn is formed with an outlet 35 leading into an air chamber 36 by means of a neck 37, this neck being provided with an outlet nipple 38 from which a flexible pipe 39 extends, this pipe being provided at its end with any suitable spraying device, as for instance a nozzle having relatively small spraying openings.

For the purpose of supporting the pump rigidly in place upon the automobile after it is put in place of the hub cap, I provide the downwardly extending converging braces 40 which are connected at their lower ends and connected to an upwardly and forwardly extending brace 41, which in turn is connected to the running board, as at 42, by means of a bolt or other suitable detachable connection.

In the use of this mechanism, the rear end of the automobile may be jacked up so that it is lifted from the floor or ground and then the coupling 19 is applied in place of the usual hub cap. The brace 41 is connected to the running board and the pump is ready for operation. It will be seen that this is a single acting pump and that when the driving shaft of the automobile is driven, the piston 12 will reciprocate, drawing in water or other liquid through the inlet pipe 28 upon the inward stroke of the piston and discharging the water through the outlet pipe 38 upon the out stroke. The air chamber 36 acts in the usual manner, the air which is compressed at the top of the chamber acting as a spring when the pump is drawing in a charge of water and forces the water out of the chamber and out through the discharge hose 39, thus keeping a steady stream. It is only necessary that the pump be run fast enough to keep this water chamber supplied with water. The air pressure in the chamber will deliver a steady stream of water. The pump will be run fast or slow according to the amount of force the operator wants on the water. The discharge pipe is provided with an adjustment on it so that the water when leaving the nozzle will take the form of a spray, as this device is particularly intended for use in washing the body of an automobile and if the water is discharged from the pipe 39 with too much force and in a solid stream, it will drive the dirt and dust into the varnish of the automobile body instead of washing it off.

It will be seen that this device is very simple, can be readily put in place and readily removed, and that it is very compact so that it may be carried as part of the automobile equipment. While I have heretofore referred to this pump as being used for the purpose of pumping water to wash an automobile, it also may be obviously modified to operate as an air pump for the purpose of inflating tires. Of course, it may be used for other pumping purposes.

While I have illustrated a form of my invention which I believe to be particularly effective and thoroughly practical, I do not wish to be limited to the details thereof, as it is obvious that these might be modified in many ways without departing from the spirit of the invention.

I claim:—

A pumping attachment for automobiles comprising a cylinder having a connected crank case, means for supporting the attachment on the running board of an automobile, the cylinder at its opposite end from the crank case being provided with an approximately triangular head formed with an outlet and an inlet opening, a pipe leading from the inlet opening of the head, an inlet flap valve controlling the passage through the inlet opening, an outlet flap valve controlling passage through the outlet opening, a substantially triangular casing detachably engaged with the face of the head having the outlet flap valve, said casing having an outlet opening, a discharge pipe operatively connected with the outlet opening, a piston operating within the cylinder, a crank within the crank case, a connection between the piston and crank, and means for detachably connecting the crank to the driving shaft of an automobile.

In testimony whereof I hereunto affix my signature.

WIGO G. NYMON.